WAVE TRAP SYSTEM FOR DUPLEX OPERATION FROM A SINGLE ANTENNA

Filed July 13, 1964

Inventors
JOSEPH LOOS,
RONALD J. WANAT
By Mueller & Aichele
Attys.

3,293,644
Patented Dec. 20, 1966

3,293,644

WAVE TRAP SYSTEM FOR DUPLEX OPERATION FROM A SINGLE ANTENNA

Joseph Loos, Morton Grove, and Ronald J. Wanat, Streamwood, Ill., assignors to Motorola, Inc., Franklin Park, Ill., a corporation of Illinois Filed July 13, 1964, Ser. No. 382,310
10 Claims. (Cl. 343—180)

This invention relates to a diplexer circuit for connecting a transmitter and a receiver to a single antenna, and more particularly to such a circuit for permitting simultaneous operation of the transmitter and receiver with a minimum of interference.

In two-way radio communication equipment, the transmitter and receiver of the equipment may be connected to a single antenna. In many applications a switching circuit of some type is used so that the transmitter and receiver are selectively connected and are not both connected simultaneously. However, in some applications it is desired to connect the transmitter and receiver to the same antenna for simultaneous operation. In such cases it is necessary to provide a diplexer for coupling the transmitter and receiver to the antenna so that the transmitter and receiver are isolated from each other.

One application in which a transmitter and receiver are connected to the same antenna is in mobile radio telephone systems. In one system which has been proposed, the transmitter operates on one frequency and the receiver on another frequency, and the receiver is of the superheterodyne type having a local oscillator at the transmitter frequency. This makes it possible to use the same oscillator for the transmitter and the receiver. However, the problem arises that signals at the image frequency of the receiver which are picked up by the antenna will combine with the strong transmitted signals to provide signals at the receiver frequency which are sufficiently strong to interfere with the receiver operation. This problem is not restricted to systems wherein the receiver oscillator is at the transmitter frequency however, and exists in any system wherein signals may be applied to the transmitter which differ in frequency from the frequency of the transmitted signal by the same amount that the receiver signal differs therefrom, and which signals are on the opposite side of the transmitted frequency. Such a signal will be referred to hereinafter as a mirror frequency signal.

It is, therefore, an object of the present invention to provide an improved diplexer circuit for connecting a transmitter and receiver to a single antenna for simultaneous operation.

Another object of the invention is to provide a diplexer for connecting a transmitter and a receiver operating at different frequencies to the same antenna for simultaneous operation, and in which the diplexer attenuates mirror frequency signals (signals differing in frequency from the transmitted signal by the same amount as the receiver signals and on the opposite side) which could produce intermodulation with the transmitted signal.

A further object of the invention is to provide a diplexer for connecting a transmitter and receiver for simultaneous operation at different frequencies from the same antenna wherein signals at the mirror frequency are attenuated before reaching the transmitter, and intermodulation signals at the receiver frequency, developed at the transmitter, are also attenuated.

A feature of the invention is the provision of a diplexer circuit for connecting a transmitter and a receiver to a single antenna wherein the diplexer includes a trap for signals at the mirror frequency (the frequency spaced from the transmitter frequency the same amount as the receiver frequency and on the opposite side of the transmitter frequency), so that mirror frequency signals are attenuated and do not mix with the transmitted signals to produce interfering signals at the receiver frequency.

A further feature of the invention is the provision of a diplexer circuit including helical resonators which form traps at the receiver and mirror frequencies, and couple the transmitter and receiver to the antenna terminal, with a parallel tuning element cooperating with the transmitter coupling resonator to attenuate the receiver frequency, and a parallel tuning element cooperating with the receiver coupling resonator to attenuate the transmitter frequency. The resonators at the mirror and receiver frequencies cooperate to form an anti-resonant circuit at the transmitter frequency, so that transmitted signals are not attenuated thereby.

The invention is illustrated in the drawing wherein.

In practicing the invention there is provided a diplexer circuit for connecting a transmitter and receiver to a single antenna for simultaneous operation therewith. The transmitter and receiver operate at different frequencies and the transmitted signal is quite strong so that signals spaced from the transmitted signal the same amount as the receiver signals, and on the opposite side thereof, produce strong intermodulation components at the receiver frequency. These signals are referred to as mirror frequency signals. The transmitter is coupled to the antenna through a series resonant circuit, which may be provided by a helical resonator, tuned to the transmitter frequency. A reactive tuning element is shunted across this helical resonator for providing a high impedance at the receiver frequency. In the event that the transmitter frequency is above the receiver frequency this may be an inductor. Coupled between the transmitter terminal and ground are two additional series resonant circuits, one tuned to the receiver frequency and the other to the mirror frequency. These series resonant circuits cooperate with each other to form an anti-resonant circuit at the transmitter frequency. The receiver is coupled to the antenna through a series resonant circuit, which also may be a helical resonator, and which is tuned to the receiver frequency. A reactive element is also bridged across this helical resonator to produce a high impedance at the transmitter frequency, and this may be a capacitor in a system in which the transmitter frequency is above the receiver frequency.

In one system as described, the receiver local oscillator may be at the same frequency as the transmitter. In such case the mirror signals referred to are at the same frequency as the image frequency of the receiver. In any case mirror frequency signals entering the transmitter can mix with the strong transmitted signals to produce signals of the receiver frequency. This action is reduced by the mirror frequency trap which greatly reduces the applied mirror frequency signals. Further, intemodulation signals produced at the receiver frequency are reduced by the trap tuned to the receiver frequency, and also by the coupling circuit between the transmitter and the antenna which is anti-resonant at the receiver frequency.

Figure 1:
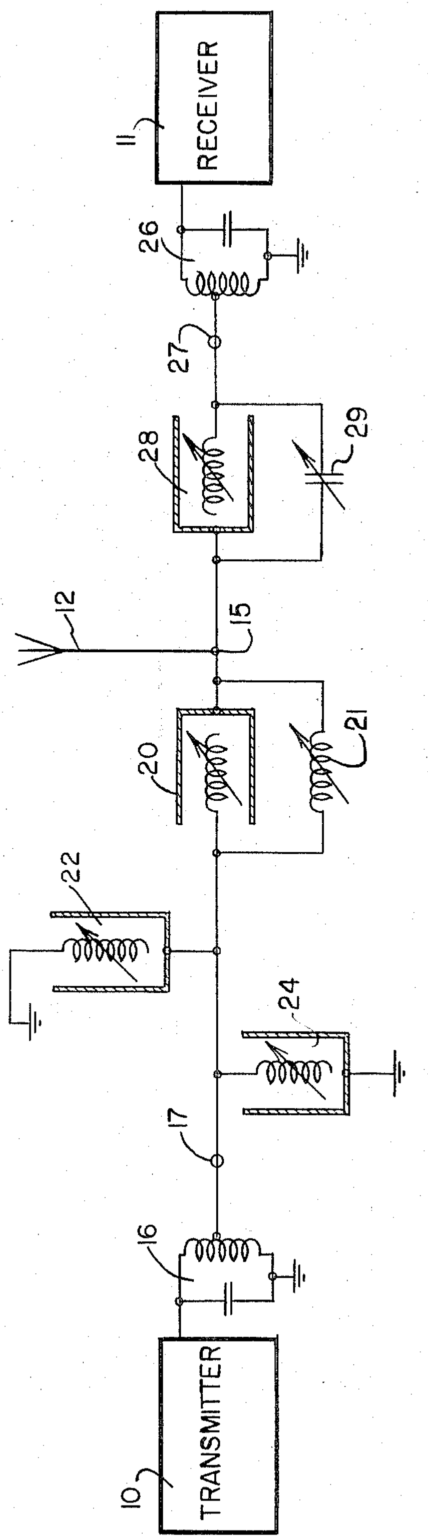
FIG. 1 is a schematic diagram of the diplexer circuit of the invention.

Referring now to the drawing, in FIG. 1 there is shown the diplexer circuit of the invention for connecting transmitter 10 and receiver 11 to antenna 12. The antenna 12 is connected to antenna terminal 15, and the transmitter 10 is connected through impedance matching circuit 16 to connector 17. Connected between transmitter connector 17 and antenna terminal 15 is helical resonator 20 which is series resonant at the transmitter frequency, so that a low impedance is presented to signals being applied from the transmitter to the antenna 12. The helical resonator 20 may be a helical coil in a conducting shield, with the capacity between the coil and shield being effectively in series with the coil so that a series resonant circuit is formed. The helical resonator may be tuned by a core which changes the inductance of the coil, and/or by a movable element which changes the capacity between the coil and the shield. Known helical resonator elements are available for providing this operation.

Figure 2:
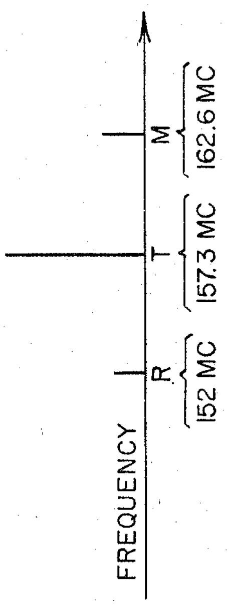
FIG. 2 illustrates the relation of the transmitter, receiver and mirror frequencies in the system of FIG. 1.

In order to provide a high impedance at the receiver frequency, coil 21 is bridged across the helical resonator 20 and cooperates with the resonator 20 to form an anti-resonant circuit at the receiver frequency. FIG. 2 shows the relation of the frequencies in a representative unit, with the receiver operating at 152 megacycles and the transmitter at 157.3. The resonator 20, therefore, is series resonant at 157.3 megacycles and is tuned by the coil 21 to form an anti-resonant circuit at 152 megacycles. The figures given are merely illustrative and the diplexer can be used in a system operating at any frequencies. In the event that the receiver frequency is below the transmitter frequency, the shunt reactor required to make the circuit anti-resonant at a higher frequency would be capacitive rather than inductive.

A second helical resonator 22 is connected between the transmitter connector 17 and a reference potential which is shown as ground. The helical resonator 22 may be similar to the resonator 20, but is tuned to the receiver frequency. A third helical resonator 24 is also connected between the connector 17 connected to the transmitter and ground, and this resonator is tuned to the mirror frequency. In the example illustrated in FIG. 2, the mirror frequency designated "M" is at 162.6 megacycles. The mirror frequency differs from the transmitter frequency by the same amount that the receiver frequency differs therefrom, but in the opposite direction. In order that the resonators 22 and 24 do not attenuate the transmitter frequency they must present a high impedance at this frequency. This can be accomplished by bridging a reactor across each resonator to provide an anti-resonant circuit. However, since the resonators 22 and 24 are tuned to frequencies which differ from the transmitter frequency by the same amount, the resonators cooperate with each other to provide an anti-resonant circuit at the transmitter frequency and separate reactive elements are not required.

The receiver 11 is connected through impedance matching circuit 26 to the receiver connector 27. Connected between the antenna terminal 15 and the receiver connector 27 is a fourth helical resonator 28. This helical resonator may also be of the same construction as the helical resonator 20 and is tuned to the receiver frequency so that signals are transmitted therethrough from the antenna 12 to the receiver 11. The helical resonator 28 may be identical to helical resonator 22, since both are series resonant at the receiver frequency. Bridged across the resonator 28 is variable capacitor 29. Variable capacitor 29 may be tuned so that it cooperates with resonator 28 to form an anti-resonant circuit at the transmitter frequency. Accordingly, signals at the transmitter frequency applied to antenna 12 are not applied to the receiver 11.

FIG. 2 illustrates the action which can take place in the diplexer circuit. The transmitted signal designated T is a very strong signal. The mirror signal which might be picked up by the antenna, designated M, is much weaker but can mix with the transmitted signal to produce a signal at the receiver frequency, designated R, which is strong enough to cause objectionable interference in the receiver. The diplexer circuit acts to attenuate the mirror frequency signals applied from the antenna to the transmitter because of the action of the resonator 24 which forms a trap to short such signals to ground. Further, any intermodulation signals produced at the transmitter, and which are at the receiver frequency, are trapped or shorted to ground by the helical resonator 22. Also, the anti-resonant circuit formed by resonator 20 and coil 21 presents a high impedance to signals at the receiver frequency. Accordingly, mirror signals from antenna 12 cannot react with the transmitter signals to produce strong signals at the receiver frequency, a portion of which might appear at terminal 15 and be applied through resonator 28 to the receiver 11.

As previously stated, receiver 11 may be of the superheterodyne type having a local oscillator at the transmitter frequency. In the example illustrated in FIG. 2, the local oscillator is at a frequency of 157.3 megacycles. This would provide an intermediate frequency at 5.3 megacycles. The receiver may be of the double superheterodyne type having a second lower intermediate frequency. In this example, the mirror frequency is the same as the image frequency of the receiver, so that signals of the mirror frequency picked up by antenna 12 can mix with the strong signals produced by the transmitter 10 to provide intermodulation components at the receiver frequency. These signals can be strong enough to cause a disturbance in the receiver and prevent proper operation thereof.

The diplexer circuit of the invention has been found to be effective to connect a transmitter and receiver to the same antenna for simultaneous operation. When the signals are received at a frequency such that intermodulation products may be produced at the receiver frequency, the diplexer circuit is effective to greatly reduce such components.

We claim:

1. A circuit for simultaneously connecting a transmitter and a receiver to the same antenna, and wherein the transmitter operates at a first frequency and the receiver operates at a second frequency different from the first frequency, said circuit including in combination, an antenna terminal, a transmitter connector, a receiver connector, first tuned circuit means having relatively low impedance at the first frequency connecting said transmitter connector to said antenna terminal, second tuned circuit means connected between said transmitter connector and a reference potential and having relatively low impedance at a frequency spaced from the first frequency by the same amount that the second frequency differs from the first frequency and in the opposite direction, third tuned circuit means having relatively low impedance at the second frequency connected between said transmitter connector and the reference potential, and fourth tuned circuit means having relatively low impedance at the second frequency connecting said receiver connector to said antenna terminal.

2. A circuit for simultaneously connecting a transmitter and a receiver to the same antenna, and wherein the transmitter operates at a first frequency and the receiver operates at a second frequency different from the first frequency, said circuit including in combination, an antenna terminal, a transmitter connector, a receiver connector, first tuned circuit means having relatively low impedance at the first frequency connecting said transmitter connector to said antenna terminal, second tuned circuit means connected between said transmitter connector and a reference potential and having relatively low impedance at a frequency spaced from the first frequency by the same amount that the second frequency differs from the first frequency and in the opposite direction, and third tuned circuit means having relatively low impedance at the second frequency connecting said receiver connector to said antenna terminal.

3. A circuit for connecting a transmitter and a receiver to the same antenna, and wherein the transmitter and receiver operate simultaneously at different frequencies, said circuit including in combination, an antenna terminal, a transmitter connector, a receiver connector, first tuned circuit means connecting said transmitter connector to said antenna terminal and series resonant at the transmitter frequency, tuning means bridged across said first tuned circuit means and cooperating therewith to attenuate signals at the receiver frequency, second tuned circuit means connected between said transmitter connector and a reference potential and series resonant at a frequency spaced from the transmitter frequency by the same amount that the receiver frequency differs from the transmitter frequency and in the opposite direction, third tuned circuit means connecting said receiver connector to said antenna terminal and series resonant at the receiver frequency, and tuning means bridged across said third tuned circuit means and cooperating therewith to attenuate signals at the transmitter frequency.

4. A circuit for connecting a transmitter and a receiver to the same antenna, and wherein the transmitter and receiver operate simultaneously at different frequencies, said circuit including in combination, an antenna terminal, a transmitter connector, a receiver connector, first tuned circuit means connecting said transmitter connector to said antenna terminal and series resonant at the transmitter frequency, tuning means bridged across said first tuned circuit means and cooperating therewith to attenuate signals at the receiver frequency, second tuned circuit means connected between said transmitter connector and a reference potential and series resonant at the receiver frequency, third tuned circuit means connected between said transmitter connector and the reference potential and series resonant at a frequency spaced from the transmitter frequency by the same amount that the receiver frequency differs from the transmitter frequency and in the opposite direction, fourth tuned circuit means connecting said receiver connector to said antenna terminal and series resonant at the receiver frequency, and tuning means bridged across said fourth tuned circuit means and cooperating therewith to attenuate signals at the transmitter frequency.

5. A circuit for simultaneously connecting a transmitter and a receiver to the same antenna, and wherein the transmitter operates at a first frequency and the receiver operates at a second frequency different from the first frequency, said circuit including in combination, an antenna terminal, a transmitter connector, a receiver connector, first tuned circuit means having relatively low impedance at the first frequency connecting said transmitter connector to said antenna terminal, second tuned circuit means connected between said transmitter connector and a reference potential and having a portion providing a path having a relatively low impedance at a frequency spaced from the first frequency by the same amount that the second frequency differs from the first frequency and in the opposite direction, said second tuned circuit means presenting a relatively high impedance at said first frequency, and third tuned circuit means having relatively low impedance at the second frequency connecting said receiver connector to said antenna terminal.

6. A circuit for connecting a transmitter and a receiver to the same antenna, and wherein the transmitter and receiver operate simultaneously at different frequencies, said circuit including in combination, an antenna terminal, a transmitter connector, a receiver connector, first tuned circuit means connecting said transmitter connector to said antenna terminal and series resonant at the transmitter frequency, tuning means bridged across said first tuned circuit means and cooperating therewith to attenuate signals at the receiver frequency, second tuned circuit means connected between said transmitter connector and a reference potential and including a portion series resonant at a frequency spaced from the transmitter frequency by the same amount that the receiver frequency differs from the transmitter frequency and in the opposite direction, said second tuned circuit means including reactance means cooperating with said series resonant portion thereof to form an anti-resonant circuit at the transmitter frequency, third tuned circuit means connecting said receiver connector to said antenna terminal and series resonant at the receiver frequency, and tuning means bridged across said third tuned circuit means and cooperating therewith to attenuate signals at the transmitter frequency.

7. A circuit for connecting a transmitter and a receiver to the same antenna, and wherein the transmitter and receiver operate simultaneously at different frequencies, said circuit including in combination, an antenna terminal, a transmitter connector, a receiver connector, first tuned circuit means connecting said transmitter connector to said antenna terminal and series resonant at the transmitter frequency, tuning means bridged across said first tuned circuit means and cooperating therewith to attenuate signals at the receiver frequency, second tuned circuit means connected between said transmitter connector and a reference potential and series resonant at the receiver frequency, third tuned circuit means connected between said transmitter connector and the reference potential and series resonant at a frequency spaced from the transmitter frequency by the same amount that the receiver frequency differs from the transmitter frequency and in the opposite direction, said second and third tuned circuit means cooperating to form an anti-resonant circuit at the transmitter frequency, fourth tuned circuit means connecting said receiver connector to said antenna terminal and series resonant at the receiver frequency, and tuning means bridged across said fourth tuned circuit means and cooperating therewith to attenuate signals at the transmitter frequency.

8. A circuit for connecting a transmitter and a receiver to the same antenna, and wherein the transmitter operates at a first frequency and the receiver operates at a second frequency and is of the superheterodyne type having a local oscillator operating at the first frequency, said circuit including in combination, an antenna terminal, a transmitter connector, a receiver connector, first tuned circuit means connecting said transmitter connector to said antenna terminal and series resonant at the first frequency, tuning means bridged across said first tuned circuit means and cooperating therewith to attenuate signals at the second frequency, second tuned circuit means connected between said transmitter connector and said reference potential and series resonant at a frequency spaced from the first frequency by the same amount that the second frequency differs from the first frequency and in the opposite direction, third tuned circuit means connecting said receiver terminal to said antenna terminal and series resonant at the second frequency, and tuning means bridged across said third circuit means and cooperating therewith to attenuate signals at the first frequency.

9. A circuit for connecting a transmitter and a receiver to the same antenna, and wherein the transmitter operates at a first frequency and the receiver operates at a second frequency and is of the superheterodyne type having a local oscillator operating at the first frequency, said circuit including in combination, an antenna connector, transmitter connecting means, receiver connecting means, first tuned circuit means having relatively low impedance at the first frequency connecting said transmitter connecting means to said antenna terminal, tuning means bridged across said first tuned circuit means and cooperating therewith to produce a relatively high impedance at the second frequency, second tuned circuit means having relatively low impedance at the second frequency connected between said transmitter connecting means and a reference potential, third tuned circuit means connected between said transmitter connecting means and said reference potential and having relatively low impedance at a frequency spaced from the first frequency by the same amount that the second frequency differs from the first frequency and in the opposite direction, said second and third tuned circuit means cooperating to form an anti-resonant circuit at the first frequency, fourth tuned circuit means having relatively low impedance at the second frequency connecting said receiver connecting means to said antenna terminal, and tuning means bridged across said fourth tuned circuit means and cooperating therewith to produce a relatively high impedance at the first frequency.

10. A circuit for connecting a transmitter and a receiver to the same antenna, and wherein the transmitter and receiver operate simultaneously at different frequencies, said circuit including in combination, an antenna terminal, a transmitter connector, a receiver connector, a first helical resonator connecting said transmitter connector to said antenna terminal and series resonant at the transmitter frequency, tuning means bridged across said first helical resonator and cooperating therewith to attenuate signals at the receiver frequency, a second helical resonator connected between said transmitter connector and a reference potential and series resonant at the receiver frequency, a third helical resonator connected between said transmitter connector and the reference potential and series resonant at a frequency spaced from the transmitter frequency by the same amount that the receiver frequency differs from the transmitter frequency and in the opposite direction, said second and third helical resonators cooperating to form an anti-resonant circuit at the transmitter frequency, a fourth helical resonator connecting said receiver connector to said antenna terminal and series resonant at the receiver frequency, and tuning means bridged across said fourth helical resonator and cooperating therewith to attenuate signals at the transmitter frequency.

References Cited by the Examiner

UNITED STATES PATENTS

| | | | |
|---|---|---|---|
| 1,188,531 | 6/1916 | Carson | 343—180 |
| 1,309,538 | 7/1919 | Mills et al. | 343—180 |
| 1,566,680 | 12/1925 | Meissner | 325—124 |
| 1,750,347 | 3/1930 | Conrad | 325—124 |
| 3,015,099 | 12/1961 | Willard | 343—180 |

DAVID G. REDINBAUGH, *Primary Examiner.*

JOHN W. CALDWELL, *Examiner.*